US011710176B2

(12) United States Patent
Rose et al.

(10) Patent No.: US 11,710,176 B2
(45) Date of Patent: Jul. 25, 2023

(54) SYSTEM AND METHOD FOR DISPLAYING AND INTERACTING WITH ARTWORK

(71) Applicant: MSRA LLC, New York, NY (US)

(72) Inventors: Michael Rose, New York, NY (US); Keith Schweitzer, Melville, NY (US)

(73) Assignee: MSRA LLC, New York, NY (US)

( * ) Notice: Subject to any disclaimer, the term of this patent is extended or adjusted under 35 U.S.C. 154(b) by 965 days.

(21) Appl. No.: 16/591,921

(22) Filed: Oct. 3, 2019

(65) Prior Publication Data

US 2020/0111156 A1    Apr. 9, 2020

Related U.S. Application Data

(60) Provisional application No. 62/742,080, filed on Oct. 5, 2018.

(51) Int. Cl.
*G06Q 30/08* (2012.01)
*G06Q 20/32* (2012.01)
*H04W 4/35* (2018.01)
*H04L 67/02* (2022.01)
*H04W 88/02* (2009.01)

(52) U.S. Cl.
CPC ........... *G06Q 30/08* (2013.01); *G06Q 20/325* (2013.01); *H04W 4/35* (2018.02); *H04L 67/02* (2013.01); *H04W 88/02* (2013.01)

(58) Field of Classification Search
CPC .... G06Q 30/08; G06Q 20/305; G06Q 20/325; H04W 4/35; H04W 88/02; H04L 67/02
USPC .......................................................... 705/26
See application file for complete search history.

(56) References Cited

U.S. PATENT DOCUMENTS

| | | | |
|---|---|---|---|
| 5,929,848 A | 7/1999 | Albukerk et al. | |
| 8,893,012 B1 | 11/2014 | Zhang et al. | |
| 2002/0170961 A1* | 11/2002 | Dickson | G06Q 30/02 235/383 |
| 2005/0060343 A1* | 3/2005 | Gottsman | G06F 16/338 707/999.102 |
| 2006/0168300 A1 | 7/2006 | An et al. | |
| 2013/0317930 A1 | 11/2013 | Lutnick et al. | |
| 2014/0281579 A1 | 9/2014 | Trachtenberg et al. | |
| 2014/0298209 A1 | 10/2014 | Gil et al. | |

(Continued)

FOREIGN PATENT DOCUMENTS

WO    WO-03090145 A1 * 10/2003 ............. G06Q 20/12

OTHER PUBLICATIONS

International Search Report and Written Opinion dated Dec. 27, 2019 in connection with international application No. PCT/US2019/54435.

*Primary Examiner* — Brian Whipple
(74) *Attorney, Agent, or Firm* — Pryor Cashman LLP

(57) ABSTRACT

System and method for interacting with at least one item, such as at least one artwork display, including at least one display device including a housing, a visual indictor element, a processor, a memory, and wireless communication capabilities, the at least one display device disposed beside or in a vicinity of the at least one item, and a user device configured to interact with the at least one display device by providing, on the at least one display device via the visual indictor element and/or the user device via a display screen of the user device, a visual popularity indicator and a visual sale status indicator for the at least one item.

14 Claims, 2 Drawing Sheets

(56) References Cited

U.S. PATENT DOCUMENTS

| | | | |
|---|---|---|---|
| 2016/0098773 A1* | 4/2016 | Raghuveer | G06Q 30/0625 705/26.62 |
| 2016/0217528 A1 | 7/2016 | O'Connor et al. | |
| 2017/0139925 A1* | 5/2017 | Shah | H04L 65/70 |
| 2018/0288565 A1* | 10/2018 | Shuler | H04W 52/0203 |
| 2019/0234791 A1* | 8/2019 | Delgado | G01G 19/4144 |

* cited by examiner

SYSTEM AND METHOD FOR DISPLAYING AND INTERACTING WITH ARTWORK

CROSS-REFERENCE TO RELATED APPLICATIONS

The present application claims priority to U.S. Provisional Patent Application No. 62/742,080, filed Oct. 5, 2018, the disclosures and teachings of which are incorporated herein by reference.

TECHNICAL FIELD

The present invention involves a system and method for discovering, displaying, purchasing, learning about, following, and interacting with artwork. More particularly, the present invention involves a system and method for discovering, displaying, purchasing, learning about, following, and interacting with artwork through the use of a device configured to communicate with a mobile application and/or the Internet.

BACKGROUND OF THE INVENTION

Current means of viewing and purchasing artwork include art galleries and art fair booths, as well as online sellers and resellers. However, these means have deficiencies. With respect to art galleries, there are large overhead costs associated with maintaining a gallery and consequently purchasing art through such a gallery. With respect to online sellers, the purchasing process is impersonal and overwhelming, with the customer frequently forced to sift through an extensive catalog listing of artwork. Additionally, the current art auction process is inefficient, as it requires potential bidders to either be at the auction itself or possess a catalog relating to the auction and call in with a bid or submit the bid online. Therefore, there exists a need for a mechanism to view and purchase artwork that retains the social nature of art galleries with the ease and readily-available information associated with online purchases.

SUMMARY OF THE INVENTION

In general, in one aspect, the invention features a system for interacting with at least one item, including at least one display device including a housing, a visual indictor element, a processor, a memory, and wireless communication capabilities, the at least one display device disposed beside or in a vicinity of the at least one item, and a user device configured to interact with the at least one display device by providing, on the at least one display device via the visual indictor element and/or the user device via a display screen of the user device, a visual popularity indicator and a visual sale status indicator for the at least one item.

Implementations of the invention may include one or more of the following features. The user device may be configured to interact with the at least one display device via a mobile device application, a website, or a web-based platform. The user device may be a smartphone, a tablet, an IoT device, a wearable device, a laptop computer, or a desktop computer installed with the mobile application or capable of accessing the website or the web-based platform. The visual popularity indicator and/or the visual sale status indicator may be based, at least in part, on one or more of a number of views of the at least one item by one or more additional user devices, a number of views of one or more additional items from a source of the at least one item by one or more additional user devices, one or more sales history data of the source, an availability for bidding on or purchasing the at least one item, a number of previous bids or purchases of the at least one item, the time remaining to bid on or purchase the at least one item, and a number of users receiving alerts via the mobile device application, the website, or the web-based platform relating to the source or the at least one item. The visual popularity indicator and/or the visual sale status indicator may be a color-based indicator operating on a color gradient scale.

The display device may further include a display screen. The visual popularity indicator and/or the visual sale status indicator may be a text- or word-based indicator displayed on the display screen of the display device. The wireless communication capabilities of the display device may be one or more of WI-FI capabilities, BLUETOOTH capabilities, NFC capabilities, AIRPLAY capabilities, Internet of Things (IoT) capabilities, and RFID capabilities. The display device may further include location positioning capabilities, motion detection capabilities, and/or proximity detection capabilities configured to determine the location of the display device, the location of the user device, and/or the proximity of the user device to the display device. The mobile device application, the website, or the web-based platform may be configured to communicate with one or more payment processing mechanisms for paying for the at least one item and/or provide a map indicating one or more locations of the at least one item. The at least one item may be at least one artwork display.

In general, in another aspect, the invention features a method of interacting with at least one item, including providing at least one display device including a housing, a visual indictor element, a processor, a memory, and wireless communication capabilities, disposing the at least one display device beside or in a vicinity of the at least one item, interacting with the at least one display device using a user device, and providing, on the at least one display device via the visual indictor element and/or the user device via a display screen of the user device, a visual popularity indicator and a visual sale status indicator for the at least one item.

Implementations of the invention may include one or more of the following features. The user device may be configured to interact with the at least one display device via a mobile device application, a website, or a web-based platform. The user device may be a smartphone, a tablet, an IoT device, a wearable device, a laptop computer, or a desktop computer installed with the mobile application or capable of accessing the website or the web-based platform. The visual popularity indicator and/or the visual sale status indicator may be based, at least in part, on one or more of a number of views of the at least one item by one or more additional user devices, a number of views of one or more additional items from a source of the at least one item by one or more additional user devices, one or more sales history data of the source, an availability for bidding on or purchasing the at least one item, a number of previous bids or purchases of the at least one item, the time remaining to bid on or purchase the at least one item, and a number of users receiving alerts via the mobile device application, the website, or the web-based platform relating to the source or the at least one item. The visual popularity indicator and/or the visual sale status indicator may be a color-based indicator operating on a color gradient scale.

The display device may further include a display screen. The visual popularity indicator and/or the visual sale status indicator may be a text- or word-based indicator displayed on the display screen of the display device. The mobile device application, the website, or the web-based platform may communicate with one or more payment processing mechanisms for paying for the at least one item and/or provide a map indicating one or more locations of the at least one item. The at least one item may be at least one artwork display.

DETAILED DESCRIPTION OF THE INVENTION

Figure 1:
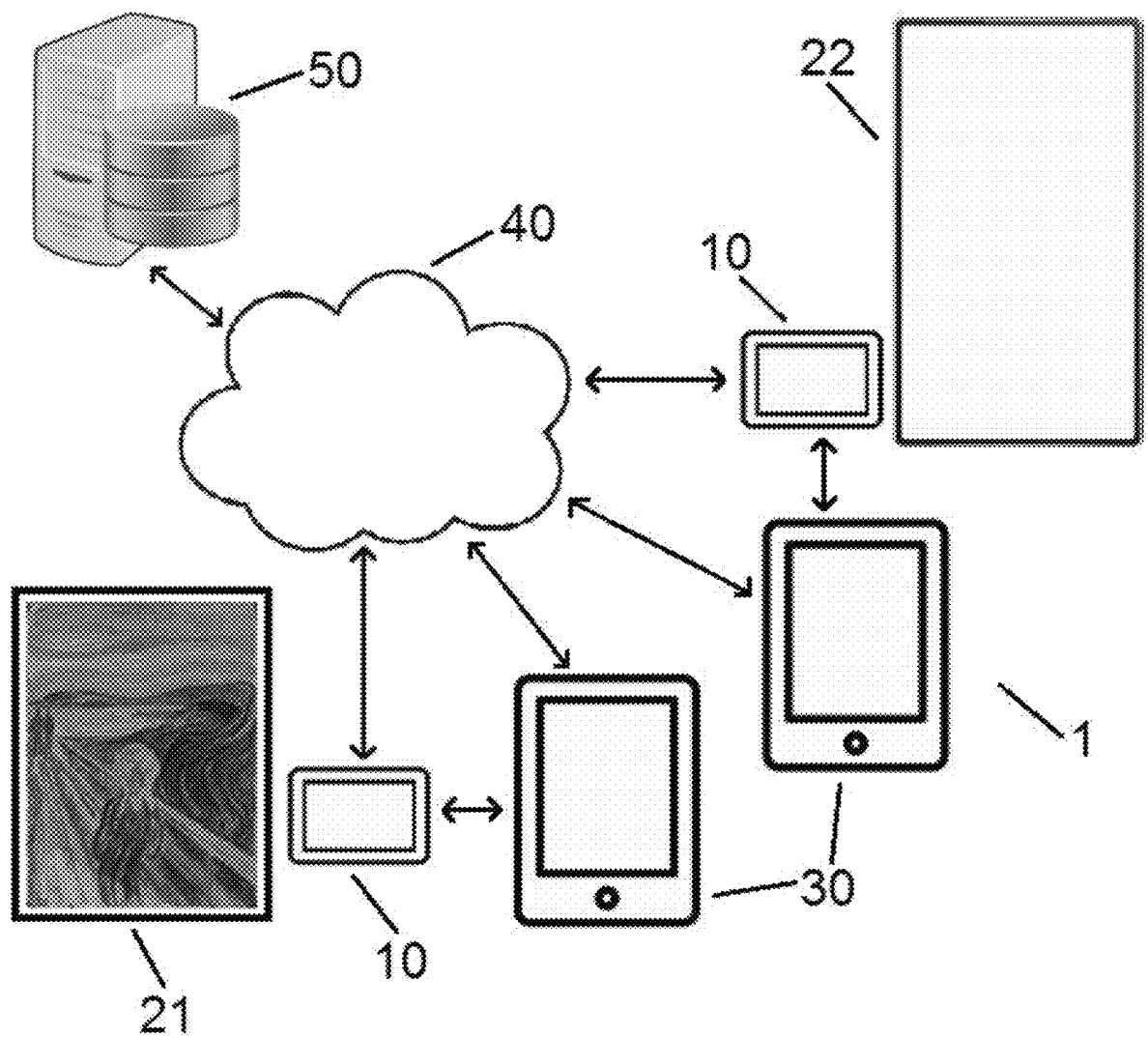
FIG. 1 shows a schematic diagram of an artwork interaction and purchase system according to one embodiment of the present invention.

The present invention relates to a system and associated method for discovering, displaying, purchasing, learning about, following, and interacting with artwork through the use of a device optionally having a display screen and configured to communicate with a mobile application and/or the Internet. FIG. 1 provides a diagram of a system 1 according to one embodiment of the present invention, particularly a network flowchart including the back-end architecture 50, the network/internet 40, several devices 10 disposed next to, or otherwise in the vicinity of, one or more pieces of artwork, which may be piece of artwork 21 or digital artwork display screen 22, and several user devices 30. In a similar fashion to the traditional rectangular artwork label disposed next to a piece of artwork that includes information on the piece, the device of the present invention is preferably disposed next to a piece of artwork. In fact, the device may have the aesthetic or appearance of a traditional rectangular artwork label. The device may display information on the artwork and may communicate this information to a user via a mobile application and/or the Internet. The information may include background information and attributes of the artwork. In addition or alternatively, the display may include only a series of light indicators. Additionally, as is relevant for the present invention, the information may include availability and auction status of the artwork.

Figure 2A:
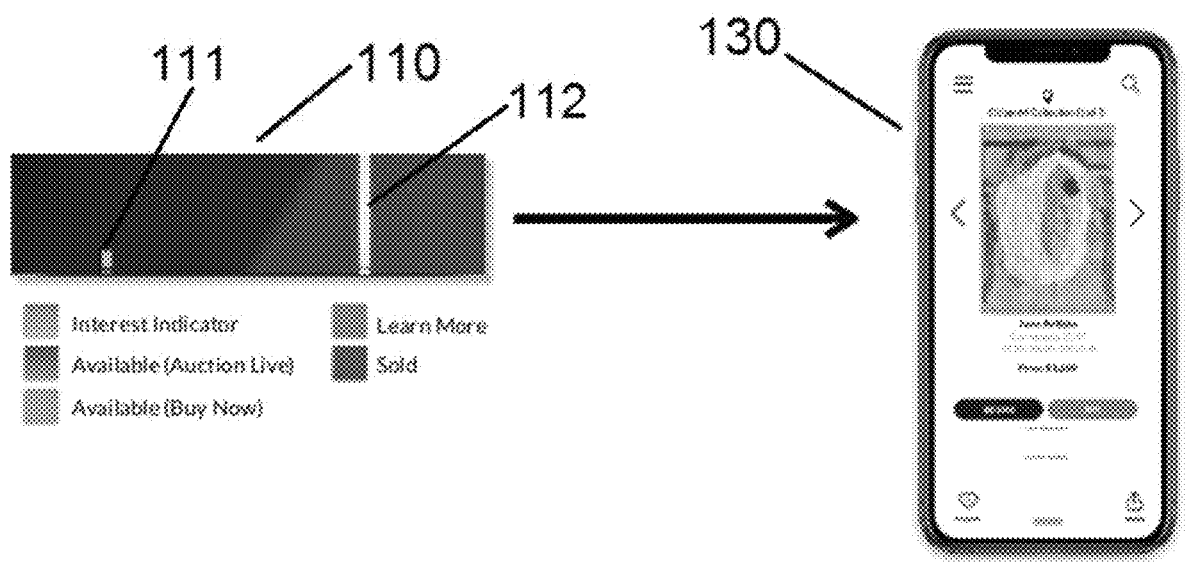
FIG. 2A shows a communication diagram between a user's mobile device and a device according to one embodiment of the present invention.
Figure 2B:
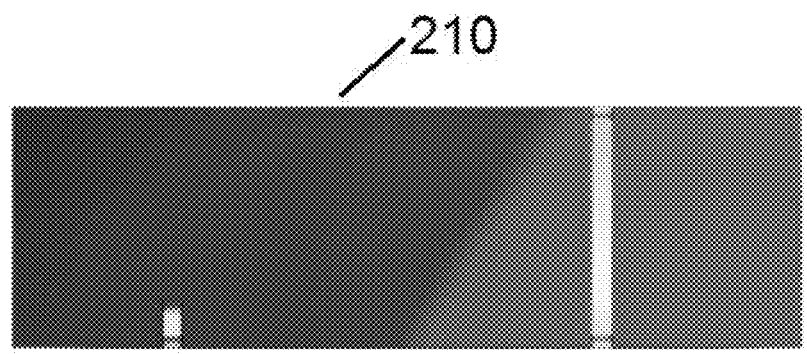
FIG. 2B shows a device according to one embodiment of the present invention.
Figure 2C:
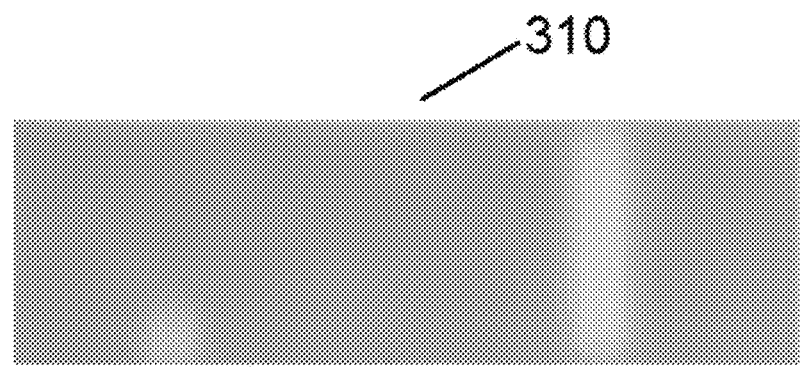
FIG. 2C shows a device according to another embodiment of the present invention.

In the embodiments shown in FIGS. 2A-2C, FIG. 2A provides a diagram illustrating communications between a device 110 of the present invention and a user device 130. Device 110 may be a rectangular device that may be disposed next to, or otherwise in the vicinity of, one or more pieces of artwork. Preferably, device 110 includes at least one visual indictor element or a plurality of visual indicator elements. The visual indicator element may be a visual popularity indicator, a visual sale status indicator, or some other indicator signifying an attribute of the one or more pieces of artwork, e.g., local vs. non-local artist, charitable element included, emerging vs. established artist, price verified, etc. Where there is a plurality of visual indicator elements, the visual indicator elements may be sized differently and/or represent different visual indications. In FIG. 2A, small visual indicator element 111 is a visual popularity indicator. A color or colors indicating popularity, i.e., interest, of the one or more pieces of artwork may be set and/or varied by an administrator of the system. In one embodiment, the color scheme is set to range from green-blue (little interest) to orange-red (large interest). Additionally, in FIG. 2A, large visual indicator element 112 is a visual sale status indicator. A color or colors indicating a sale status of the one or more pieces of artwork may be set and/or varied by an administrator of the system. In one embodiment, a red color indicates a "sold" status, a blue color indicates an "information only" or "learn more" status, a light green color indicates an "available for purchase" or "buy now" status, and a dark green color indicates an "available for bidding" or "live auction" status. The visual indicator elements may be configured for real-time update.

User device 130 is illustrated as displaying a mobile device application or website, in which the relevant artwork and associated information is presented. From this mobile device application or website, a user may, e.g., learn about, bid, buy, share, and follow the one or more pieces of artwork and/or the associated artists. The mobile device application and/or website may include additional features to assist the user, including a map feature configured to display nearby artwork and/or indicate one or more locations of the one or more pieces of artwork, an alert feature to inform the user of the presence and/or availability of artwork based on, e.g., the user's preferences, interests, and location, and a messaging/chat feature to permit the user to communicate with the artist, the seller, the host, and similar persons/entities.

FIGS. 2B and 2C provide non-limiting examples of devices capable of use in the present invention. In both device 210 of FIG. 2B and device 310 of FIG. 2C, the electronic components may include one or more of a single-PCB design, a BLUETOOTH 5 module (NRF 52), 3 RGB LEDs, and a 1200 mAH lithium ion polymer battery. Devices 210 and 310 may operate for approximately two weeks or greater with USB charging. Connectivity associated with devices 210 and 310 include BLUETOOTH Low Energy (BLE), BLUETOOTH Mesh, and the like for communicating with a user device, connecting and distributing information, and updating software. The present invention also provides for the availability of scanning or imaging artwork using a camera, such as a camera associated with a user device.

Devices 210 and 310 include multiple visual indicator elements, which may conform to the aforementioned color schemes to indicate popularity and sale status information. Device 210 may have a black design of polished polycarbonate, and device 310 may have a white design of frosted polycarbonate. Devices 210 and 310 may include or be used in connection with a magnetic steel bracket and VHB mounting tape in order to affix the device to a structure, such as a wall nearby or in the vicinity of one or more pieces of artwork. The device may utilize any known attachment mechanism for affixing the device to a structure, including but not limited to magnets, nails, screws, and the like. Device 310 may include a glowing border, implemented by 9 RGB LEDs, that signifies active interaction with the associated one or more pieces of artwork, such as by a user and/or an associated user device. Snap-on placards may be reversibly attached to devices 210 and 310, such placards providing information on the one or more pieces of artwork, such as artist name, artwork title, artwork date/year, medium, size, and price.

A device of the present invention may include a housing, a power source, e.g., battery, a processor, a memory, and wireless communication aspects, among other items. The wireless communication aspects may include WI-FI capabilities, BLUETOOTH capabilities, NFC capabilities, AIR- PLAY capabilities, RFID capabilities, IoT capabilities, and the like. It is preferable that the device be configured to communicate with a mobile application and/or the Internet. The device may include location positioning capabilities or proximity detection capabilities configured to determine the location of the display device, the location of the user device installed with the mobile application, and/or the proximity of the user device to the display device. Similarly, the device may also include motion detection capabilities, e.g., sensors, to react and/or power on when a user or other individual approaches or is in proximity of the device. In the case of a user that has the mobile application on his or her device, the device may provide the user, via the mobile application, with information about nearby piece or pieces of artwork. The device may also include facial recognition capabilities to recognize users. The device is preferably capable of transmitting information to an unlimited number of devices simultaneously. In embodiments of the present invention in which the device does not include a display screen, the device may be configured to include a series of lights, which may be a single color, multi-color, or otherwise. The lights may indicate whether a sale or auction for the associated piece of artwork has started, whether the artwork is no longer available for purchase, whether there is interest in the artwork, and the like. The indication may be provided and updated with respect to the displayed shade, brightness, and/or color of the light and changes thereto. Relatedly, in embodiments of the present invention in which the device does not include a display screen, relevant information is provided to the user through his or her user device, such as via the mobile application and/or the Internet. In general, all data and information obtained through the display devices and associated user's mobile applications and their interactions with the website may be sent to and stored in the back-end server for real-time processing, including updating the display information on the pieces of artwork and syncing the information with the display devices, user devices, mobile applications, and other applications.

The device may be a tablet device, an electronic device smaller than a tablet device, an electronic device having a rectangular shape, and the like. The device may optionally have a display screen, which may be an LCD, LED, QLED, OLED, plasma, e-ink, e-paper, or similar screen. The display screen of the device may have capacitive touchscreen capabilities. In additional embodiments, the device may be configured to communicate with other similar devices associated with different pieces of artwork and/or different locations, and/or may be configured to communicate with digital artwork display screens, e.g., LCD, LED, QLED, OLED, or plasma screens displaying digital artwork and disposed next to or nearby the relevant device. As previously suggested, the system may employ a plurality of devices, each disposed next to or nearby different pieces of artwork or different groupings of artwork, including artwork at a multitude of locations, and the user, via the mobile application and/or the Internet, may interact with many, if not all, of the different pieces of artwork. Locations for device/artwork installation include, but are not limited to, hotels, membership clubs, restaurants, bars, coffee shops and cafés, offices and office lobbies, coworking spaces, public spaces, and retail stores. The artwork may take, but is not limited to, the following forms, including originals and/or copies: painting, such as canvas, framed, and the like, drawing, printmaking, sculpture, ceramics, photography, video, film-making, electronic art, crafts, and architecture. Additionally, the device may be used in conjunction with additional items besides artwork, such items including but not limited to design, decor, furniture, and household appliances and consumer goods (e.g., refrigerators).

In a preferred embodiment of the present invention, the system is directed to displaying artwork and associated information for the purpose of learning about, following, selling and purchasing said artwork. Information relating to the availability and auction status of a piece of artwork is preferably updated in real-time, synchronized across the entire platform and for all users, and capable of operating both online and offline. The device is configured to connect to and communicate with a mobile application, preferably a mobile application installed on a user's mobile device, and the Internet, such as a website or web-based platform, which may be accessed by a desktop or laptop computer. By this communication, the user is able to see, via the mobile application, information on a piece of artwork, including availability and auction status information as well as background information on the piece of artwork and the artist. Audio and video relating to the artwork, the sale, and/or the auction may also be streamed to the user by this mechanism. Additionally, the user, via the mobile application, may place a bid on, purchase, and/or follow the piece, i.e., create alerts relating to the piece's status. In taking such action, the user is subsequently provided with, via the mobile application or website, real-time updates on the piece's status. This functionality associated with the mobile application, as well as any additional functionality described herein, may also be employed by a website or web-based platform. Relatedly, the user may perform the aforementioned functions on his or her user device, including a user's mobile device, via a mobile application and/or the Internet when such user device is not communicating or in communication with the devices disclosed herein.

A display screen of the device and the display of the mobile application may present identical information. The information may be in the form of visual indicators. In one embodiment, there are up to three or more visual indicators: one reflecting the status of the original artwork, one reflecting the status of physical editions of the original artwork, and one reflecting the status of digital editions or licenses of the original artwork; or one reflecting the popularity of the piece, one the sale status, and one the days left to purchase, if relevant. The indicators may represent a variety of information, and may provide indications that video or audio information is available, etc. The visual indicators may include a countdown clock or timer indicating the time remaining to bid on or purchase the artwork. The visual indicators can, in essence, represent anything. Alternatively, the indicators can be used in conjunction with text displayed on the display device, or only text may be displayed. If the piece is being auctioned, the visual indicator may include the price necessary to be the current winning bidder or the minimum bid needed. This price may be updated as other users outbid each other for the artwork, raising the current winning price of the piece. If the piece is available for regular purchase, the visual indicator may include the price necessary to purchase the piece and the number of available units of the piece. In both scenarios of auctioning and regular purchase, the visual indicator may include a color aspect, text- or word-based feature, or similar visual rubric indicative of the potential for other bidders or purchasers. Further, the piece of artwork may be sold by a process that is a hybrid of an auction and a set-price offer. The color aspect may operate on a gradient scale, in which the currently-displayed color is generated based on multiple factors, including but not limited to the number of views of the piece of artwork, both online and offline, the number of views of other artwork by the same artist, the artist's sales history, the number of past bids on or previous purchases of the piece, the time remaining to bid on or purchase the piece, the number of users following the piece and/or the artist, and the like.

Another visual indicator that may be displayed on a display screen of the device is a bar code, QR code, or similar scanning code capable of being imaged, scanned, or read by a camera or other sensor of a user's mobile having the mobile application installed thereon. After the appropriate imaging, scanning, or reading, the device may be paired with the mobile application, such that the mobile application may then display information on the piece of artwork, including the aforementioned information. The mobile application may also then reproduce the aforementioned visual indicators. If the user doesn't have the mobile application, the scanning will take the user to the listing of the application in the application store relevant to user's device.

Additionally, as previously suggested, the mobile application may permit the user to follow, and similarly unfollow if desired, a piece of artwork. By following a piece of artwork, indicators associated with the relevant device will be saved, such as in the form of a favorite, within the mobile application for quick recall of the artwork and associated information. Moreover, by following a piece of artwork, the user may be provided with updates and alerts relating to the artwork, including but not limited to the time remaining to bid on or purchase the piece, the current price to successfully bid on or purchase the piece, and any available resale of the piece after initial sale or purchase. In one embodiment of the present invention, the mobile application automatically adds a user as a follower of a piece of artwork and/or the associated artist in response to the user bidding on or purchasing said piece. Additionally, as previously suggested, the system may be utilized in reselling pieces of artwork. When a user who previously successfully bid on or purchased a piece of artwork wishes to resell the piece, or if that piece is otherwise being put up for sale, the system may be configured to alert those users who had previously unsuccessfully bid on the piece during a previous auction, those users who are or were following the piece and/or the associated artist, and the like.

The mobile application may be configured to sync with third party payment applications and mechanisms, such that the user may be able to bid on and/or purchase a piece of artwork via the mobile application and pay for the piece in doing so. The mobile application may sync with a credit or debit card, a checking or savings account, an APPLE PAY account, a GOOGLE PAY account, a VENMO account, a PAYPAL account, a STRIPE account, cryptocurrency platform accounts, and similar payment methods.

Upon successfully bidding on or purchasing a piece of artwork, a digital certificate of ownership may be generated, whereby the certificate may be electronically sent to the user and stored in the mobile application and/or the user's account in the associated website or web-based platform. For original artwork and physical editions of the original artwork, a physical version of the certificate of ownership may be sent along with the artwork, while for digital editions or licenses of the original artwork, the only available certificate may be the digital certificate of ownership.

The mobile application may also be configured to provide maps indicating locations of the relevant pieces of artwork as well as listings of relevant pieces of artwork. The maps may provide the user with the closest location in which a specific piece of artwork is displayed, relative to the user's current or saved position. The maps and/or listings may provide further indicators, visual or otherwise, indicating locations where the original artwork is displayed, locations where physical editions of the original artwork are displayed, and locations where digital editions or licenses of the original artwork are displayed, with these indicators distinguishing between the three categories of artwork.

Data relating to the sales and/or auctions, including bids, purchases, and follows, i.e., interest shown by users, may be collected and provided to the art gallery, auction house, space where the art was purchased such as a hotel, membership club, restaurant, bar, coffee shop or café, office or office lobby, coworking space, public space, retail store, or similar entity. These entities may have an analytics and marketing dashboard capable of obtaining and processing this data, so as to, e.g., review historical sales and predict future sales. Marketing services may also be sold to these companies to enable them to market to prospective buyers. Data may also be anonymized, or partially anonymized, and packed and sold to various entities as a data sales product to provide those entities with insights and research into the art market.

The embodiments and examples above are illustrative, and many variations can be introduced to them without departing from the spirit and scope of the disclosure or from the scope of the invention. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the drawings and descriptive matter, in which there is illustrated a preferred embodiment of the invention.

What is claimed is:

1. A system for interacting with at least one artwork display, comprising:
    at least one display device comprising a housing, a visual indictor element, a processor, a memory, and wireless communication capabilities, the at least one display device associated with the at least one artwork display; and
    a user device configured to communicate and interact, via a mobile device application, a website, or a web-based platform, with the at least one display device by providing, on the at least one display device via the visual indictor element and the user device via a display screen of the user device, a visual popularity indicator for the at least one artwork display and a visual sale status indicator for the at least one artwork display,
    wherein one or both of the visual popularity indicator and the visual sale status indicator is based, at least in part, on one or more of:
        a number of views of the at least one artwork display by one or more additional user devices;
        a number of views of one or more additional items from a source of the at least one artwork display by one or more additional user devices;
        one or more sales history data of the source;
        an availability for bidding on or purchasing the at least one artwork display;
        a number of previous bids or purchases of the at least one artwork display;
        the time remaining to bid on or purchase the at least one artwork display; and a number of users receiving alerts via the mobile device application, the website, or the web-based platform relating to the source or the at least one artwork display.

2. The system of claim 1, wherein the user device is a smartphone, a tablet, an IoT device, a wearable device, a laptop computer, or a desktop computer installed with the mobile application or capable of accessing the website or the web-based platform.

3. The system of claim 1, wherein the visual popularity indicator and/or the visual sale status indicator is a color-based indicator operating on a color gradient scale.

4. The system of claim 1, wherein the display device further comprises a display screen.

5. The system of claim 4, wherein the visual popularity indicator and/or the visual sale status indicator is a text-based or word-based indicator displayed on the display screen of the display device.

6. The system of claim 1, wherein the wireless communication capabilities of the display device are one or more of WI-FI capabilities, BLUETOOTH capabilities, NFC capabilities, AIRPLAY capabilities, Internet of Things (IoT) capabilities, and RFID capabilities.

7. The system of claim 1, wherein the display device further comprises location positioning capabilities, motion detection capabilities, and/or proximity detection capabilities configured to determine a location of the display device, a location of the user device, and/or a proximity of the user device to the display device.

8. The system of claim 1, wherein the mobile device application, the website, or the web-based platform is configured to communicate with one or more payment processing mechanisms for paying for the at least one artwork display and/or provide a map indicating one or more locations of the at least one artwork display.

9. A method of interacting with at least one artwork display, comprising:
providing at least one display device comprising a housing, a visual indictor element, a processor, a memory, and wireless communication capabilities, the at least one display device associated with the at least one artwork display;
communicating and interacting with the at least one display device using a user device via a mobile device application, a website, or a web-based platform; and
providing, on the at least one display device via the visual indictor element and the user device via a display screen of the user device, a visual popularity indicator for the at least one artwork display and a visual sale status indicator for the at least one artwork display,
wherein one or both of the visual popularity indicator and the visual sale status indicator is based, at least in part, on one or more of:
a number of views of the at least one artwork display by one or more additional user devices;
a number of views of one or more additional items from a source of the at least one artwork display by one or more additional user devices;
one or more sales history data of the source;
an availability for bidding on or purchasing the at least one artwork display;
a number of previous bids or purchases of the at least one artwork display;
the time remaining to bid on or purchase the at least one artwork display; and
a number of users receiving alerts via the mobile device application, the website, or the web-based platform relating to the source or the at least one artwork display.

10. The method of claim 9, wherein the user device is a smartphone, a tablet, an IoT device, a wearable device, a laptop computer, or a desktop computer installed with the mobile application or capable of accessing the website or the web-based platform.

11. The method of claim 9, wherein the visual popularity indicator and/or the visual sale status indicator is a color-based indicator operating on a color gradient scale.

12. The method of claim 9, wherein the display device further comprises a display screen.

13. The method of claim 12, wherein the visual popularity indicator and/or the visual sale status indicator is a text-based or word-based indicator displayed on the display screen of the display device.

14. The method of claim 12, wherein the mobile device application, the website, or the web-based platform communicates with one or more payment processing mechanisms for paying for the at least one artwork display and/or provides a map indicating one or more locations of the at least one artwork display.

* * * * *